United States Patent
Zhou et al.

(10) Patent No.: US 12,487,346 B2
(45) Date of Patent: Dec. 2, 2025

(54) LIDAR AND ADJUSTMENT METHOD THEREOF

(71) Applicant: SUTENG INNOVATION TECHNOLOGY CO., LTD., Shenzhen (CN)

(72) Inventors: Yong Zhou, Shenzhen (CN); Songshan Hou, Shenzhen (CN); Ji Wang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 1105 days.

(21) Appl. No.: 17/483,985

(22) Filed: Sep. 24, 2021

(65) Prior Publication Data
US 2022/0011418 A1    Jan. 13, 2022

Related U.S. Application Data

(63) Continuation of application No. PCT/CN2019/081578, filed on Apr. 4, 2019.

(30) Foreign Application Priority Data

Mar. 25, 2019  (CN) .......................... 201910225399.6

(51) Int. Cl.
*G01S 7/497*    (2006.01)
*G01S 7/481*    (2006.01)
(Continued)

(52) U.S. Cl.
CPC .......... *G01S 7/4972* (2013.01); *G01S 7/4814* (2013.01); *G01S 7/4816* (2013.01); *G01S 7/4817* (2013.01); *G02B 27/283* (2013.01); *G02B 27/30* (2013.01)

(58) Field of Classification Search
CPC ...... G01S 7/4972; G01S 7/481; G01S 7/4816; G02B 27/023; G02B 27/1822; G02B 27/283

See application file for complete search history.

(56) References Cited

U.S. PATENT DOCUMENTS 6,747,267 B1    6/2004    Balasubramaniam
10,211,593 B1   2/2019    Lingvay et al.
(Continued)

FOREIGN PATENT DOCUMENTS

CN    101614820 A    12/2009
CN    101738609 A    6/2010
(Continued)

OTHER PUBLICATIONS

European Search Report issued in corresponding European Application No. EP20784075.2, mailed Nov. 25, 2022, 10 pages.
(Continued)

*Primary Examiner* — Thanh Luu
(74) *Attorney, Agent, or Firm* — BAYES PLLC

(57) ABSTRACT

A lidar and a lidar adjustment method are provided. The lidar includes at least one transceiver component. The at least one transceiver component includes an emitting assembly, a beam splitting assembly, and a receiving assembly. The emitting assembly is configured to emit an outgoing light signal. The outgoing light signal is emitted, through the beam splitting assembly, towards a detection region and reflected by a target object to form a reflected light signal. The receiving assembly is configured to receive the reflected light signal after being deflected by the beam splitting assembly.

19 Claims, 8 Drawing Sheets

(51) Int. Cl.
*G02B 27/28* (2006.01)
*G02B 27/30* (2006.01)

(56) References Cited

U.S. PATENT DOCUMENTS

| | | | |
|---|---|---|---|
| 2009/0129420 A1 | 5/2009 | Regaard et al. | |
| 2016/0170024 A1 | 6/2016 | Böckem et al. | |
| 2016/0356706 A1 | 12/2016 | Kurtz et al. | |
| 2017/0131388 A1 | 5/2017 | Campbell et al. | |
| 2018/0172803 A1 | 6/2018 | Liang et al. | |
| 2018/0210069 A1 | 7/2018 | Mase et al. | |
| 2018/0286909 A1 | 10/2018 | Eichenholz et al. | |
| 2019/0041515 A1* | 2/2019 | Haruguchi | G01S 7/4817 |
| 2019/0113622 A1 | 4/2019 | Wu et al. | |
| 2019/0221988 A1* | 7/2019 | Villeneuve | G01S 7/4865 |
| 2021/0018745 A1* | 1/2021 | Huang | G02B 27/48 |

FOREIGN PATENT DOCUMENTS

| | | |
|---|---|---|
| CN | 102230962 A | 11/2011 |
| CN | 102520524 A | 6/2012 |
| CN | 103323957 A | 9/2013 |
| CN | 103675795 A | 3/2014 |
| CN | 105277931 A | 1/2016 |
| CN | 205067745 U | 3/2016 |
| CN | 105911562 A | 8/2016 |
| CN | 106443699 A | 2/2017 |
| CN | 107356911 A | 11/2017 |
| CN | 207336754 U | 5/2018 |
| CN | 108132472 A | 6/2018 |
| CN | 108139468 A | 6/2018 |
| CN | 108226898 A | 6/2018 |
| CN | 108226899 A | 6/2018 |
| CN | 108594206 A | 9/2018 |
| CN | 108627813 A | 10/2018 |
| CN | 108955563 A | 12/2018 |
| CN | 108988951 A | 12/2018 |
| CN | 109031243 A | 12/2018 |
| CN | 109031244 A | 12/2018 |
| CN | 109061667 A | 12/2018 |
| CN | 109324376 A | 2/2019 |
| CN | 109343067 A | 2/2019 |
| CN | 109375230 A | 2/2019 |
| CN | 109387550 A | 2/2019 |
| CN | 109597050 A | 4/2019 |
| CN | 109613515 A | 4/2019 |
| CN | 109709572 A | 5/2019 |
| CN | 109991585 A | 7/2019 |
| DE | 102017214705 A1 | 2/2019 |
| JP | 2002148562 A | 5/2002 |
| JP | 2009520353 A | 5/2009 |
| KR | 101884781 B1 | 8/2018 |

OTHER PUBLICATIONS

First Office Action issued in related Chinese Application No. 201980002537.2, mailed Mar. 27, 2023, 17 pages.
European Search Report issued in corresponding European Application No. EP19920889.3, mailed Nov. 21, 2022, 15 pages.
International Search Report issued in corresponding International Application No. PCT/CN2019/104431, mailed May 27, 2020, 5 pages.
First Office Action issued in related Chinese Application No. 201980002536.8, mailed Feb. 11, 2023, 8 pages.
International Search Report issued in corresponding International Application No. PCT/CN2020/074320, mailed Apr. 22, 2020, 5 pages.
International Search Report issued in corresponding international application No. PCT/CN2019/081578, dated Dec. 24, 2019, 6 pages.

* cited by examiner

S201: A beam splitter assembly is fixed to a base, a light exit port of an emitting assembly is aligned with a first port of the beam splitting assembly, and the emitting assembly is fixed to the base.

S202: A reflector supporting assembly of a reflector assembly is fixed above the beam splitting assembly, and a light input port of the reflector assembly is aligned with a second port of the beam splitting assembly S203: A light input port of a receiving assembly is aligned with a light exit port of the reflector assembly, and the receiving assembly is fixed to the reflector assembly S204: A reflected light signal is received by the receiving assembly; an outgoing light signal enters the beam splitting assembly through the first port and exits through a third port and is transmitted to a detection region; at least part of the outgoing light signal is reflected by a target object in the detection region and return as the reflected light signal; the reflected light signal enters through the third port of the beam splitting assembly and is directed by the beam splitting assembly to the reflector assembly through the second port; a reflector in the reflector assembly further directs the reflected light signal to the receiving assembly S205: The reflected light signal is compared with a preset light signal threshold S206: In response to the reflected light signal being smaller than the preset light signal threshold, at least one of position and angle of the reflector in the reflector assembly is adjusted S207: In response to the reflected light signal being greater than or equal to preset the light signal threshold, the current position of the reflector in the reflector assembly is deemed the desired position S208: The reflector is fixed to the reflector supporting assembly corresponding to the desired position

FIG. 7

S301: A beam splitter assembly is fixedly connected to a base

S302: A light exit port of an emitting assembly is aligned with a light input port of a reflector assembly, and a light exit port of reflector assembly is aligned with a first port of the beam splitting assembly; at least one of position of the emitting assembly, position of the reflector assembly, and angle of the reflector assembly is adjusted, until an outgoing light signal generated by the emitting assembly is aligned with the first port of the beam splitting assembly after reflected by the reflector assembly; the reflector assembly is fixed to the base, and the emitting assembly is fixed to the reflector assembly.

S303: A light input port of a receiving assembly is aligned with a second port of the beam splitting assembly and receives a reflected light signal; an outgoing light signal enters the beam splitting assembly through the first port and exits through a third port and is transmitted to a detection region; at least part of the outgoing light signal is reflected by a target object in the detection region and return as the reflected light signal; the reflected light signal enters through the third port of the beam splitting assembly and is directed by the beam splitting assembly to the receiving assembly through the second port S304: The reflected light signal is compared with a preset light signal threshold S305: In response to the reflected light signal being smaller than the preset light signal threshold, the position of the receiving assembly is adjusted S306: In response to the reflected light signal being greater than or equal to the preset light signal threshold, the current position of the receiving assembly is deemed the desired position S307: The receiving assembly is fixed corresponding to the desired position

FIG. 11

LIDAR AND ADJUSTMENT METHOD THEREOF

CROSS-REFERENCE TO RELATED APPLICATIONS

The present application is a continuation of International Application No. PCT/CN2019/081578, filed Apr. 4, 2019, which claims priority to Chinese Patent Application No. 201910225399.6, filed March 25, the entire contents of both of which are incorporated herein by reference.

TECHNICAL FIELD

The present disclosure relates to the field of lidar, and in particular, relates to a lidar and an adjustment method thereof.

BACKGROUND

Lidar is a radar system that emits a laser beam to detect position, velocity, and other characteristic quantities of a target object. Its working principle is that a transmitting assembly first emits an outgoing light signal towards the target object, and a receiving assembly receives the light signal reflected from the target object. The reflected light signal is compared with the outgoing light signal. After processing, relevant information of the target object, such as parameters of distance, orientation, height, speed, attitude, and even shape of the target object can be obtained.

Currently, because sizes of laser emission aperture and laser receiving aperture of coaxial optical path of lidar are limited, the detection effect and detection distance of lidar are thus limited. As a result, the coaxial optical path of lidar frequently fails to meet detection requirements. In addition, the field of view of a single emitting assembly and the field of view of a single receiving assembly in a lidar under the coaxial design are insufficient to meet the detection requirements. Therefore, some lidars adopt multiple emitting assemblies to splice the emitting field of view and multiple receiving assemblies to splice the receiving field of view to expand their scanning ranges.

Usually, multiple emitting assemblies form an emitting system, and multiple receiving assemblies form a receiving system. The emitting system and the receiving system may be adjusted independently. However, a lidar includes many optical components accurately and compactly assembled within a limited inner space. The optical components may mutually affect performances of each other during adjustment. Consequently, adjusting and calibrating an existing lidar is complicated, difficult, and inefficient. In addition, existing lidar design causes high maintenance and service costs.

SUMMARY

According to some embodiments of the present disclosure, a lidar and a method of adjusting a lidar are provided.

According to a first aspect of the present disclosure, a lidar is provided. The lidar may include at least one transceiver component. The at least one transceiver component may include an emitting assembly, a beam splitting assembly, and a receiving assembly. The emitting assembly may be configured to emit an outgoing light signal. The outgoing light signal may be emitted, through the beam splitting assembly, towards a detection region and reflected by a target object to form a reflected light signal. The beam splitting assembly may be configured to deflect the reflected light signal. The receiving assembly may be configured to receive the reflected light signal after deflection.

A second aspect of the present disclosure provides a lidar adjustment method. According to the method, a light exit port of an emitting assembly may be aligned with a first port of a beam splitting assembly. The emitting assembly may be fixed on a base, and the beam splitting assembly and the base may form an integrated structure or are fixedly connected. A light input port of a reflector assembly may be aligned with a second port of the beam splitting assembly. A reflector supporting assembly of the reflector assembly may be fixed on top of the beam splitting assembly. A light input port of a receiving assembly may be aligned with a light exit port of the reflector assembly.

A reflected light signal that emits towards the receiving assembly may be received. An outgoing light signal from the emitting assembly may enter the first port of the beam splitting assembly, exit from a third port of the beam splitting assembly and emit to a detection region where it is reflected by a target object to form a reflected light signal. The reflected light signal may enter the third port of the beam splitting assembly, and exit from the second port of the beam splitting assembly after being deflected by the beam splitting assembly. The reflected light signal may be emitted towards the receiving assembly after being reflected by a reflector of the reflector assembly.

The reflected light signal may be compared with a preset light signal threshold.

In response to the reflected light signal being lower than the preset light signal threshold, at least one of a position of the reflector, an angle of the reflector, or a position of the receiving assembly may be adjusted.

In response to the reflected light signal being greater than or equal to the preset light signal threshold, a current position of the reflector to be a desired position of the reflector, a current angle of the reflector to be a desired position of the reflector, and a current position of the receiving assembly to be a desired position of the receiving assembly may be determined.

The reflector may be mounted on the reflector supporting assembly based on the desired position and the desired angle of the reflector.

The receiving assembly may be connected with the reflector assembly based on the desired position of the receiving assembly.

A third aspect of the present disclosure provides a lidar adjustment method. According to the method, a light exit port of an emitting assembly may be aligned with a first port of a beam splitting assembly. The emitting assembly may be fixed on a base. The beam splitting assembly and the base may form an integrated structure or be fixedly connected.

A light input port of a receiving assembly may be aligned with a second port of the beam splitting assembly to receive a reflected light signal that emits towards the receiving assembly. An outgoing light signal from the emitting assembly may enter the first port of the beam splitting assembly, exit from a third port of the beam splitting assembly, and emit to a detection region where it is reflected by a target object to form the reflected light signal. The reflected light signal may enter the third port of the beam splitting assembly, exit from the second port of the beam splitting assembly after being deflected by the beam splitting assembly, and be emitted towards the receiving assembly.

The reflected light signal may be compared with a preset light signal threshold.

In response to the reflected light signal being lower than the preset light signal threshold, a position of the receiving assembly may be adjusted.

In response to the reflected light signal being greater than or equal to the preset light signal threshold, a current position of the receiving assembly may be determined to be a desired position of the receiving assembly.

The receiving assembly may be mounted based on the desired position of the receiving assembly.

A fourth aspect of the present disclosure a lidar adjustment method. According to the method, a light exit port of an emitting assembly may be aligned with a light input port of a reflector assembly where a beam splitting assembly and a base may form an integrated structure or may be fixedly connected. A light exit port of the reflector assembly may be aligned with a first port of the beam splitting assembly. At least one of a position of the emitting assembly, a position of the reflector assembly, or an angle of a reflector of the reflector assembly may be adjusted to align an outgoing light signal, emitted by the emitting assembly and reflected by the reflector assembly, with the first port of the beam splitting assembly. The reflector assembly may be fixedly mounted on the base. The emitting assembly may be fixedly mounted with the reflector assembly.

A light input port of a receiving assembly may be aligned with a second port of the beam splitting assembly to receive a reflected light signal that emits towards the receiving assembly. An outgoing light signal from the emitting assembly may enter the first port of the beam splitting assembly, exit from a third port of the beam splitting assembly, and emit to a detection region where it is reflected by a target object to form a reflected light signal. The reflected light signal may enter the third port of the beam splitting assembly, exit from the second port of the beam splitting assembly after being deflected by the beam splitting assembly, and may be emitted towards the receiving assembly.

The reflected light signal may be compared with a preset light signal threshold.

In response to the reflected light signal being lower than the preset light signal threshold, a position of the receiving assembly may be adjusted.

In response to the reflected light signal being greater than or equal to the preset light signal threshold, a current position of the receiving assembly may be determined to be a desired position of the receiving assembly. The receiving assembly may be mounted based on the desired position of the receiving assembly.

BRIEF DESCRIPTION OF THE DRAWINGS

One or more embodiments are illustrated exemplarily by the pictures in the accompanying drawings corresponding thereto, and these exemplary illustrations do not constitute a limitation on the embodiment, and elements in the accompanying drawings having the same reference numerical designation are indicated as similar elements, and the drawings in the accompanying drawings do not constitute a limitation of scale unless specifically stated.

FIG. 7 is a lidar adjustment method according to some embodiments of the present disclosure.

FIG. 11 is a lidar adjustment method according to some embodiments of the present disclosure.

LIST OF REFERENCE NUMERALS

| | |
|---|---|
| Transceiver component | 10 |
| Base | 100 |
| Emitting assembly | 101 |
| Emission board | 1011 |
| Emission board adjustment base | 1012 |
| Emission board adjustment cover | 1013 |
| Beam splitting assembly | 102 |
| Beam splitter supporting assembly | 1021 |
| Beam splitter | 1022 |
| Secondary beam splitter | 1023 |
| Pressing block | 1024 |
| Receiving assembly | 103 |
| Receiving board base | 1031 |
| Reflector assembly | 104 |
| Reflector supporting assembly | 1041 |
| Reflector cover | 1042 |
| Reflector | 1043 |
| Adjusting member | 1044 |
| Collimating assembly | 105 |
| Fast-axis collimator barrel | 1051 |
| Slow-axis collimator barrel | 1052 |
| Collimating lens barrel | 1053 |
| Focusing assembly | 106 |
| Focusing lens barrel | 1061 |
| Secondary beam splitting assembly | 107 |
| Secondary beam splitter supporting assembly | 1071 |
| Scanning component | 20 |
| Galvanometer assembly | 201 |
| Galvanometer | 2011 |
| Galvanometer support component | 2012 |
| Reflector assembly | 202 |
| Reflector | 2021 |
| Reflector support component | 2022 |
| Hardware component | 30 |
| Bracket | 301 |
| Base board | 302 |
| Control board | 303 |
| Bottom board | 400 |

DETAILED DESCRIPTION

In order to facilitate understanding of the present disclosure, and in order to make the above-mentioned objects, features, and advantages of the present disclosure more comprehensible, specific embodiments of the present disclosure will be described in detail below with reference to the accompanying drawings. In the following description, many specific details are set forth in order to fully understand the present disclosure, and the preferred embodiments of the present disclosure are shown in the accompanying drawings. However, the invention can be implemented in many different forms and is not limited to the embodiments described herein. Rather, these embodiments are provided to provide a thorough understanding of the present disclosure. The present disclosure can be implemented in many other ways than described herein, and those skilled in the art can make similar improvements without departing from the content of the present disclosure, so the present disclosure is not limited by the specific embodiments disclosed below.

Figure 1:
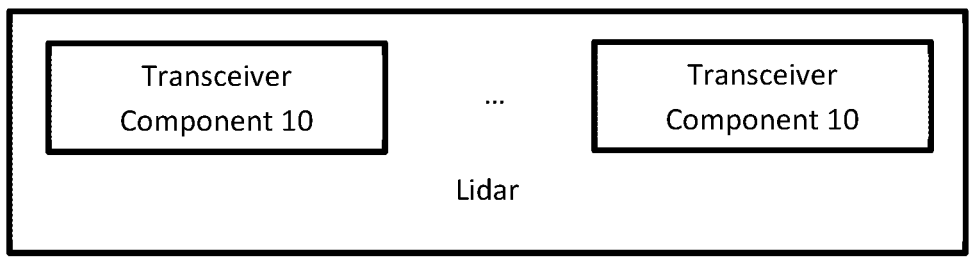
FIG. 1 is a schematic diagram of a lidar according to some embodiments of the present disclosure.
Figure 2:
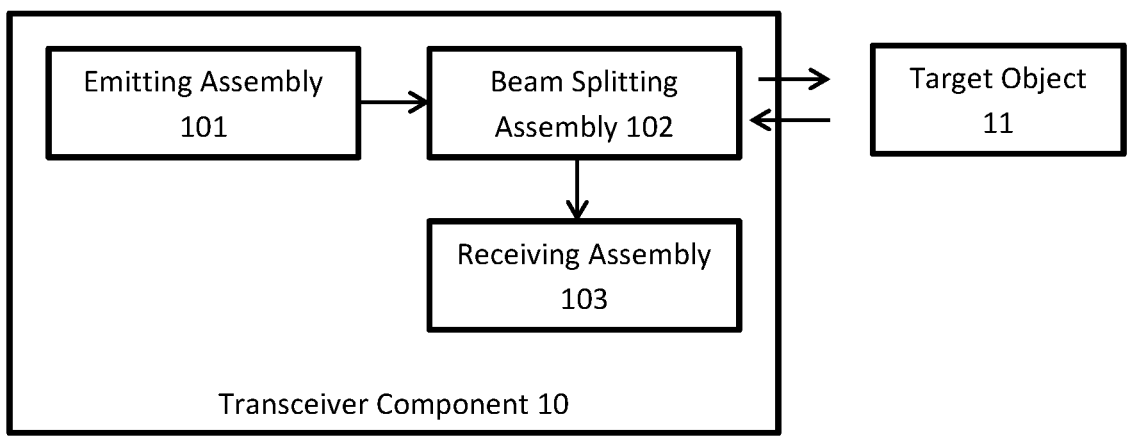
FIG. 2 is a schematic diagram of a transceiver component of a lidar according to some embodiments of the present disclosure.

Referring to FIG. 1 and FIG. 2, a lidar according to some embodiments of the present disclosure may include at least one transceiver component 10. Each of the at least one transceiver component may include an emitting assembly 101, a beam splitting assembly 102, and a receiving assembly 103. The emitting assembly 101 may emit an outgoing light signal which may pass through the beam splitting assembly 102 and reach a detection region. The outgoing light signal may be reflected by an object within the detection region and become a reflected light signal. The reflected light signal may be received by the receiving assembly 103 after being deflected by the beam splitting assembly 102.

In some embodiments, the lidar may include one transceiver component 10, or may also include a plurality of transceiver components 10. The number of transceiver components 10 may be determined according to actual need, which is not limited in the present disclosure. Each transceiver component 10 may have a limited horizontal field of view angle. When the lidar needs a larger horizontal field of view angle, for example, when a 120° horizontal field of view angle is required for the lidar, four transceiver components 10 each with a 30° horizontal field of view angle may be adopted by the lidar, in which the horizontal field of view angle of the four transceiver components 10 may be combined or spliced horizontally.

The beam splitting assembly 102 may be configured to enable the outgoing light signal pass through and emit outwards. Meanwhile, the beam splitting assembly 102 may be configured to deflect or direct a coaxially incident reflected light signal towards the receiving assembly 103.

In some embodiments, the outgoing light signal emitted from the emitting assembly 101 may pass through the beam splitting assembly 102 and be emitted towards a detection region. When a target object is within the detection region, the outgoing light signal may be reflected by the target object and become the reflected light signal. The reflected light signal may enter the beaming splitting assembly 102 when returning to the lidar. The reflected light signal may be deflected or directed by the beaming splitting assembly 102 to emit towards the receiving assembly 103 and received by the receiving assembly 103.

In some embodiments, the emitting assembly 101 may include a laser generator and a collimating module (both not shown). The laser generator may be configured to generate a laser signal. The collimating module may be configured to collimate the laser signal generated by the laser generator and emit the collimated laser signal as the outgoing light signal. In some embodiments, the laser generator may include a semiconductor laser, a fiber laser, the like, or any combinations thereof. In some embodiments, the collimating module may include a spherical lens, a spherical lens group, a cylindrical lens group, a cylindrical lens with a spherical lens group, an aspherical lens, a gradient index lens, the like, or any combinations thereof.

Further, in installation and adjustment of the emitting assembly 101, the laser generator may generate a laser beam. The laser beam may be collimated by the collimating module. When the emitting assembly 101 being adjusted, a divergence angle may be calculated by measuring a spot size of the outgoing laser beam after collimation. It may be determined that the emitting assembly 101 is properly adjusted when the divergence angle is less than or equal to a preset threshold of divergence angle; otherwise, the collimating module may require further adjustment so that the divergence angle of the laser beam after collimation is less than or equal to the present threshold of divergence angle.

In some embodiments, the receiving assembly 103 may include a detector and a focusing module (both not shown). The focusing module may be configured to receive and converge a reflected light signal. The detector may be configured to receive the reflected light signal converged by the focusing module. Additionally, the focusing module may also include a ball lens, a ball lens group, a cylindrical lens group, the like, or any combinations thereof. The detector may be an Avalanche Photo Diode (APD), a Silicon Photomultiplier (SIPM), an APD array, a Multi-pixel Photon Counter (MPPC), a Photomultiplier Tube (PMT), a Single-photon Avalanche Diode (SPAD), the like, or any combinations thereof.

Further, in the receiving assembly 103 being installed and adjusted, a laser beam may be inputted to the focusing module. When the laser beam is converged on a surface of the detector after passing through the focusing module, it may be determined that the receiving assembly 103 is properly adjusted. Otherwise, the adjustment of the focusing module may be continued until the laser beam is converged on the surface of the detector.

Figure 3:
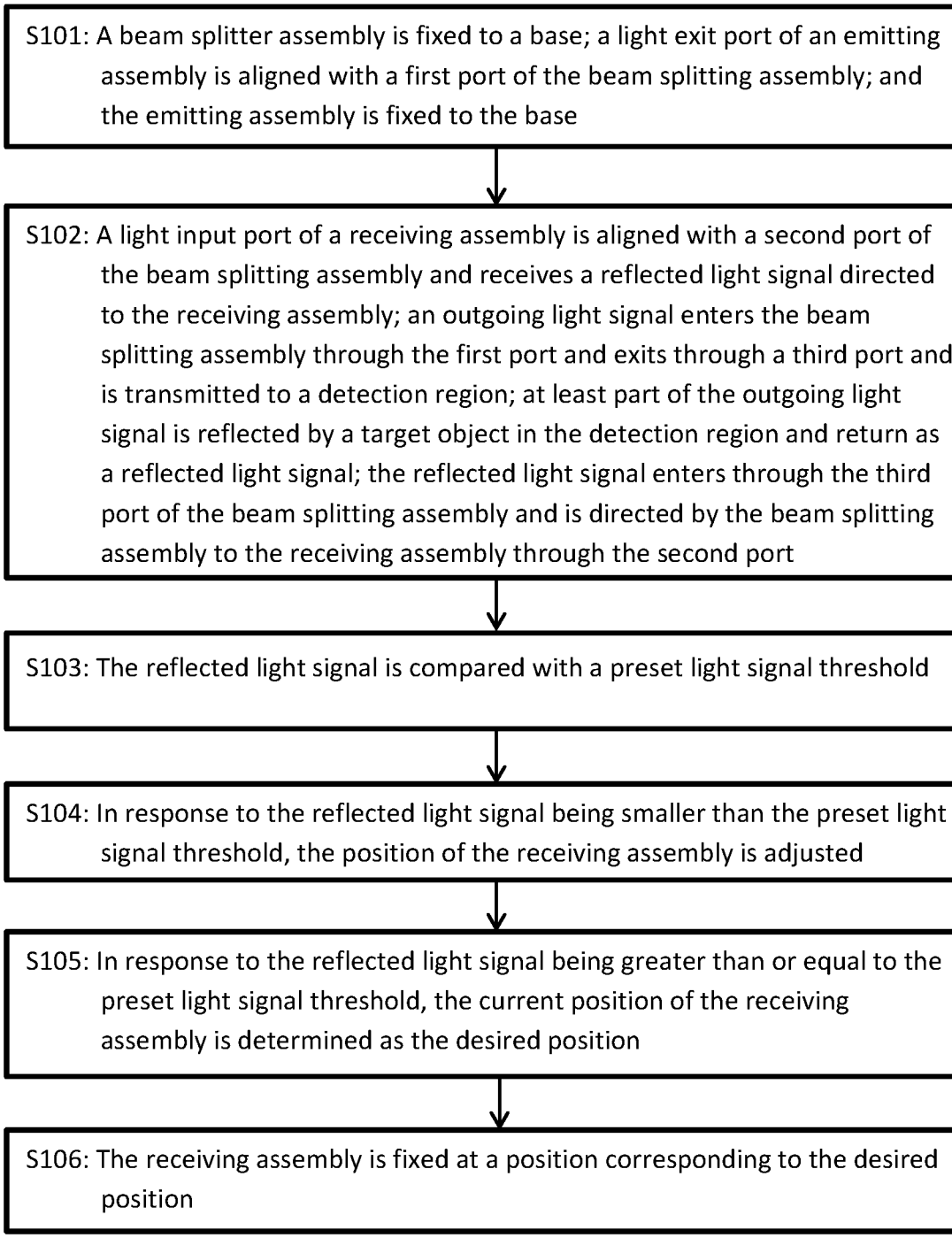
FIG. 3 is a lidar adjustment method according to some embodiments of the present disclosure.
Figure 5:
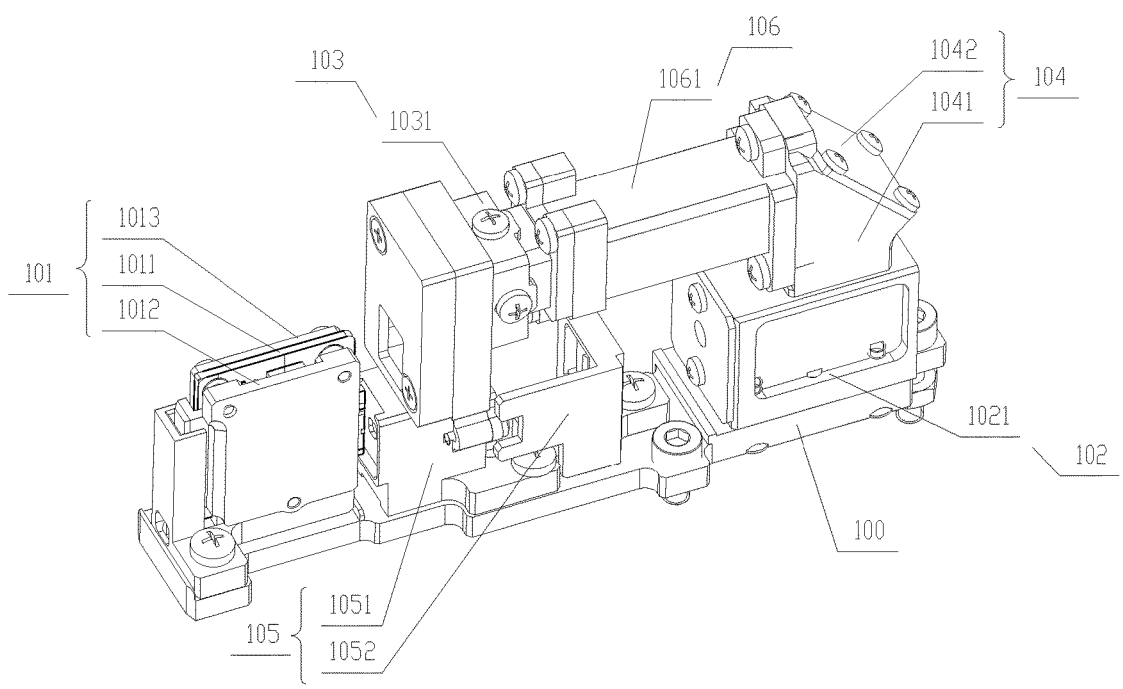
FIG. 5 is a schematic diagram of a structure of a transceiver component according to some embodiments of the present disclosure.

Embodiments of the present disclosure also provide a lidar adjustment method as shown in FIG. 3. The method may include the following steps:

S101, aligning a light exit port of the emitting assembly 101 with a first port of the beam splitting assembly 102; and fixedly mounting the emitting assembly 101 on a base 100 (shown in FIG. 5). The beam splitting assembly 102 and the base 100 may be an integrated structure or may be fixedly connected.

In some embodiments, in installation and adjustment of the transceiver component 10, the light exit port of the emitting assembly 101 may be aligned with the first port of the beam splitting assembly 102, where the beam splitting assembly 102 and the base 100 may be an integrated structure or may be fixedly connected to each other in a non-detachable manner. The emitting assembly 101 may be fixed onto the base 100. The connection may be a snap connection, a screw connection, a connection through pin(s), an adhesive connection, the like, or any combinations thereof.

S102, alighting a light input port of the receiving assembly 103 with a second port of the beam splitting assembly 102 to receive and direct the reflected light signal towards the receiving assembly 103. In some embodiments, the outgoing light signal emitted by the emitting assembly 101 may enter the first port of the beam splitting assembly 102, exit from a third port of the beam splitting assembly 102, and travel to a detection region. At least a part of the outgoing light signal may be reflected by a target object. The reflected light signal may enter the third port of the beam splitting assembly 102. The reflected light signal may be deflected by the beam splitting assembly 102 and directed towards the receiving assembly 103.

In some embodiments, before the adjustment of the lidar, a known target object can be disposed in the detection region. A distance between the known target object and the lidar may be known.

In some embodiments, the detector of the receiving assembly 103 may be configured to capture the reflected signal. The outgoing light signal emitted by the emitting assembly 101 may enter the beam splitting assembly 102 via the first port of the beam splitting assembly 102 and exit from the third port of the beam splitting assembly 102, and travel towards the detection region, where it may be reflected by the target object located therein. The reflected light signal may enter the beam splitting assembly 102 via the third port of the beam splitting assembly 102, exit via the second port of the beam splitting assembly, and travel towards the receiving assembly 103. The detector of the receiving assembly 103 may be configured to receive the reflected light signal. In one embodiment, an emitting optical path and a receiving optical path between the beam splitting assembly 102 and the target object may be coaxial.

S103, the reflected light signal may be compared with a preset light signal threshold.

The preset light signal threshold may be a preset voltage threshold or a preset current threshold.

In some embodiments, after obtaining the reflected light signal, the detector of the receiving assembly 103 may convert the reflected light signal into a voltage signal and/or a current signal, which may be compared with a preset voltage signal threshold and/or a preset current threshold.

S104, in response to the reflected light signal being lower than the preset light signal threshold, adjusting a position of the receiving assembly 103.

In one example, the reflected light signal may be converted to a voltage signal by the detector of the receiving assembly 103. In response to the voltage signal being lower than the preset voltage signal threshold, the position of the detector may be adjusted at the transceiver component 10 to adjust the position of the receiving assembly 103 such that the voltage signal obtained by the detector may meet a requirement.

S105, in response to the reflected light signal being greater or equal to the preset light signal threshold, the current position of the receiving assembly 103 may be determined to be a desired position of the receiving assembly 103.

The desired position may indicate the position on which the receiving assembly 103 may be arranged at. In this position, the receiving assembly 103 may have a good receiving performance.

Referring back to the above example of converting the reflected light signal to a voltage signal at the detector, when a comparison result of the detector shows that the voltage signal is greater than or equal to the preset light signal threshold, the current position of the detector may be determined to be a desired position of the detector so as to determine the current position of the receiving assembly 103 to be a desired position of the receiving assembly 103.

S106, the receiving assembly 103 may be fixedly mounted based on the desired position of the receiving assembly 103.

In some embodiments, the receiving assembly 103 may be fixed with respect to the beam splitting assembly 102 based on the desired position of the receiving assembly 103. The connection between the receiving assembly 103 and the beam splitting assembly 102 may be a snap connection, a screw connection, a connection through pin(s), an adhesive connection, the like, or any combinations thereof.

The lidar provided in this embodiment may include the at least one transceiver component 10 which may include the emitting assembly 101, the beam splitting assembly 102, and the receiving assembly 103. When the lidar detects for a target area, the outgoing light signal from the emitting assembly 101 may be emitted to a detection region after passing through the beam splitting assembly 102, and the reflected light signal may be reflected by a target object in the detection region. The reflected light signal may be deflected by the beam splitting assembly 102 and received by the receiving assembly 103. In installation and adjustment of the lidar, the beam splitting assembly 102 and the base 100 may form an integrated structure or fixedly connected. The light exit port of the emitting assembly 101 may be aligned with the first port of the beam splitting assembly 102 and the emitting assembly 101 may be accordingly fixed on the base 100. The light input port of the receiving assembly 103 may be aligned with the second port of the beam splitting assembly 102 to receive the reflected light signal. The reflected light signal may be compared with the preset light signal threshold. In response to the reflected light signal being lower than the preset light signal threshold, the position of the receiving assembly 103 may be adjusted. In response to the reflected light signal is greater than or equal to the preset light signal threshold, the current position of the receiving assembly 103 may be determined as the desired position of the receiving assembly 103. The lidar may include at least one of the transceiver component 10. The emitting assembly 101, beam splitting assembly 102, receiving assembly 103 of each transceiver component 10 may be pre-tuned before assembly, thereby constituting a tuned transceiver component. During the assembly of lidar, a plurality of transceiver components 10 may be spliced and combined, and the required field of view angle of the lidar may be met. The assembly process becomes simple and fast. When replacing a damaged emitting assembly or receiving assembly during maintenance, only the damaged part needs to be replaced and/or the corresponding transceiver module needs to be adjusted. Therefore, it is easy to maintain the product and reduce maintenance cost. At the same time, each transceiver component can be installed and adjusted separately to ensure that each transceiver component can emit and receive well, and thus the detection effect of lidar can be reliably guaranteed.

Figure 4:
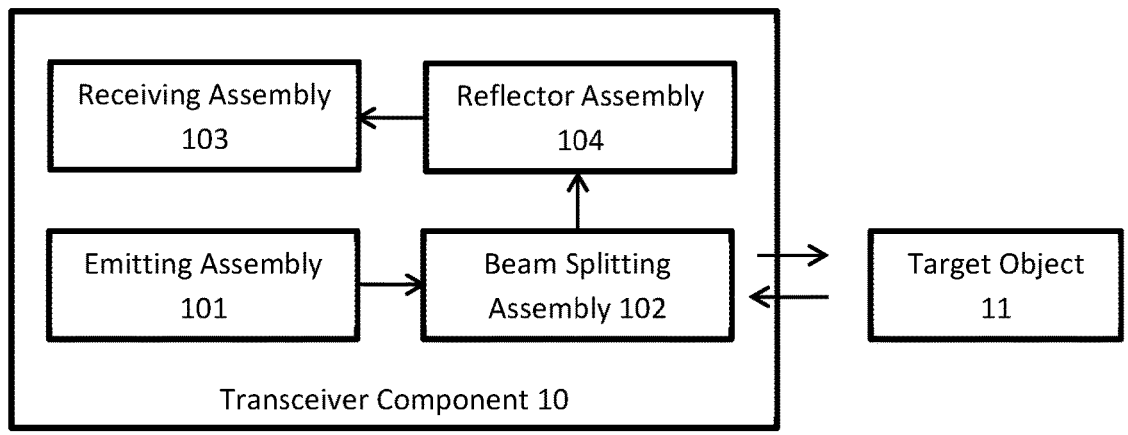
FIG. 4 is a schematic diagram of a transceiver component of a lidar according to some embodiments of the present disclosure.

Referring to FIG. 4, a lidar of some embodiments of the present disclosure is provided. Based on the embodiments of the lidar disclosed above, the transceiver component 10 may further include a reflector assembly 104. The reflector assembly 104 may be positioned between the beam splitting assembly 102 and the receiving assembly 103. After passing through the beam splitting assembly 102, the reflected light signal may be further reflected by the reflector assembly 104 and emitted towards the receiving assembly 103.

The reflected light signal after being reflected by the reflector assembly 104 may have a first optical axis. The outgoing light signal after passing though the beam splitting assembly 102 may have a second optical axis. The first optical axis and the second optical axis may be approximately parallel or may form an angle, as long as the reflected light signal can enter the receiving assembly 103. The reflector assembly 104 may be configured to fold or change the optical path of the receiving light signal so as to reduce the volume of the transceiver component 10.

In some embodiments, the outgoing light signal emitted by the emitting assembly 101 may be emitted to a detection region after passing through the beam splitting assembly 102. At least part of the outgoing light signal may be reflected by a target object in the detection region and become the reflected light signal. The reflected light signal may subsequently be incident into the beam splitting assembly 102, deflected or directed to the reflector assembly 104, reflected or directed by the reflector assembly 104 and emitted towards the receiving assembly 103, and received by the receiving assembly 103.

Figure 6:
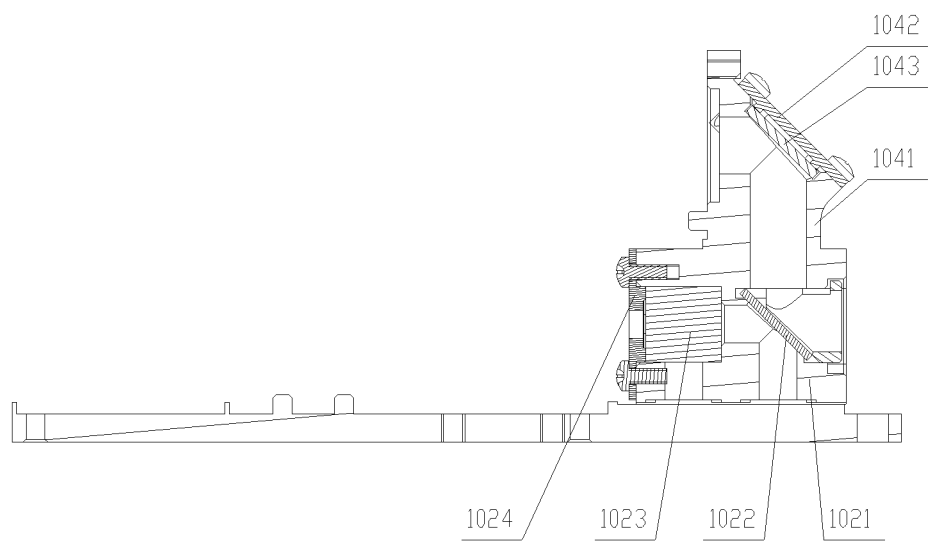
FIG. 6 is a cross-sectional view of a beam splitting assembly and reflector assembly according to some embodiments of the present disclosure.

As shown in FIG. 5 and FIG. 6, the lidar may further include the base 100. At least one transceiver component 10 may be fixed at the base 100 based on an installation angle. In some embodiments, each transceiver component 10 may be installed at the base 100 and have a corresponding installation angle. Each transceiver component 10 may be installed onto the base 100 based on the installation angle. In addition, the material and shape of the base 100 may be determined according to actual use, which is not limited in this application.

The emitting assembly 101 may be fixedly connected with the base 100 and may be aligned with the beam splitting assembly 102. In some embodiments, in installation, the emitting assembly 101 may be aligned with the beam splitting assembly 102. The outgoing light signal emitted from the emitting assembly 101 may be directed towards the beam splitting assembly 102, and the emitting assembly 101 may be accordingly fixed with the base 100. In addition, the connection between the emitting assembly 101 and the base 100 may use one or more of a snap connection, a screw connection, a connection through pin(s), an adhesive connection, the like, or any combinations thereof.

The emitting assembly 101 may include an emission board supporting assembly and an emission board 1011. The emission board 1011 may be fixed by the emission board supporting assembly. The emission board supporting assembly may include an emission board adjustment cover 1013 and an emission board adjustment base 1012. The emission board 1011 may be fixed (for example, being sandwiched) between the emission board adjustment cover 1013 and the emission board adjustment base 1012. After the emission board 1011 is aligned with the beam splitting assembly 102, the emission board adjustment base 1012 may be fixed at the base 100. In some embodiments, the emission board 1011 may be sandwiched between the emission board adjustment cover 1013 and the emission board adjustment base 1012, and the clamped emission board 1011 may be placed in a mounting position at the based 100 for adjustment. When the adjustment is completed, the emission board adjustment base 1012 may be fixed with the base 100. In addition, the connection between the emission board adjustment base 1012 and the base 100 may be a snap connection, a screw connection, a connection through pin(s), an adhesive connection, the like, or any combinations thereof.

The transceiver component 10 may further include a collimation assembly 105. The collimating assembly 105 may be disposed between the emitting assembly 101 and the beam splitting assembly 102. After the outgoing light signal is emitted by the emitting assembly 101, the collimating assembly 105 may collimate the outgoing light signal and direct it to the beam splitting assembly 102. The collimating assembly 105 may include a fast-axis collimating lens, a slow-axis collimating lens, a fast-axis collimator barrel 1051, and a slow-axis collimator barrel 1052. The fast-axis collimating lens may be placed in the fast-axis collimator barrel 1051 which may be fixed at the base 100. The slow-axis collimating lens may be placed in the slow-axis collimator barrel 1052 which may be also fixed on the base 100, for example, next to and aligned with the fast-axis collimator barrel 1051. The slow-axis collimator lens and the emitting assembly 101 may be fixed at the base 100 after aligning the slow-axis collimator lens, the emitting assembly 101, and the fast-axis collimator lens. The connection between the fast-axis collimator barrel 1051 and the base 100 may be a snap connection, a screw connection, a connection through pin(s), an adhesive connection, the like, or any combination thereof. The connection between the slow-axis collimator barrel 1052 and the base 100 may be a snap connection, a screw connection, a connection through pin(s), an adhesive connection, the like, or any combinations thereof.

With reference to FIG. 6, The beam splitting assembly 102 may include a beam splitter supporting assembly 1021 and a beam splitter 1022. The beam splitter supporting assembly 1021 and the base 100 may be formed as an integrated structure or be fixedly connected. The beam splitter 1022 may be fixed by the beam splitter supporting assembly 1021. The beam splitter supporting assembly 1021 may include a cubic structure (e.g., a cubic housing). The beam splitter supporting assembly 1021 may include a mounting position inside the housing, so that the beam splitter 1022 may be mounted on and fixed to the mounting position at a preset tilt angle and position. In some embodiments, the beam splitter supporting assembly 1021 may be a structural part preset with a tilt angle that is identical to an inclination angle of the beam splitter 1022. In one embodiment, the beam splitter supporting assembly 1021 may include a supporting surface configured for supporting the beam splitter 1022. An inclination angle of the supporting surface may be identical to the inclination angle of the beam splitter 1022. The beam splitter supporting assembly 1021 and the base 100 may be formed as an integrated structure or fixedly connected to ensure the position accuracy of installation when installing the beam splitter 1022. The material of the beam splitter supporting assembly 1021 may be the same as the base 100. When installing the beam splitter 1022, it may install the beam splitter 1022 simply onto the beam splitter supporting assembly 1021. The connection between the beam splitter 1022 and the beam splitter support assembly 1021 may be a snap connection, a screw connection, an adhesive connection, the like, or any combinations thereof. The beam splitter 1022 can be a polarizing beam splitter, a reflector with a central opening, a semi-transmissive, a semi-reflective mirror, the like, or any combination thereof.

The beam splitting assembly 102 may further include a secondary beam splitter 1023 placed between the beam splitter 1022 and the collimating assembly 105. The second beam splitter 1023 may be fixed by the beam splitter supporting assembly 1021. The beam splitter supporting assembly 1021 may be provided with an installation position of the secondary beam splitter 1023. The secondary beam splitter 1023 may be set in the beam splitter supporting assembly 1021 at a preset inclination angle and position through the secondary beam splitter mounting position and fixed by a pressing block 1024. In some embodiments, the secondary beam splitter 1023 may be a polarization beam splitter (PBS) to filter out the S-polarized laser beam. Adding the secondary beam splitter 1023 in the beam splitting assembly 102 may reduce the intensity of the outgoing signal light passing through to the beam splitter 1022, thereby reducing local heating. Since the secondary beam splitter 1023 filters out the S-polarized light, the S-polarized light is directed away from the receiving assembly 103, and undesired effects caused by the S-polarized light to the receiving assembly 103 may be minimized. Certainly, one of ordinary skill in the art would understand that without the secondary beam splitter 1023, the transceiver component 10 may still emit and receive the laser beam and reach its design requirements of signal detection. However, having the secondary beam splitter 1023 may eliminate the effects of the S-polarized light signal to the receiving assembly 103 and improve the detection performance and detection accuracy of the transceiver component 10.

The reflector assembly 104 may include a reflector supporting assembly 1041 and a reflector 1043. The reflector 1043 may be fixed by the reflector supporting assembly 1041. The reflector assembly 104 may include at least one reflector. The reflector may be a flat mirror, a cylindrical mirror, an aspheric curvature mirror, the like, or any combination thereof. In some embodiments, the reflector assembly 104 may further include a mirror cover 1042. The reflector 1043 may be fixed at the mirror cover 1042. The mirror cover 1042 may be fixedly connected with the reflector supporting assembly 1041 so as to fix the reflector 1043 in the reflector assembly 104. The connection between the mirror cover 1042 and the reflector supporting assembly 1041 may be a snap connection, a screw connection, a connection through pin(s), an adhesive connection, the like, or any combinations thereof.

The receiving assembly 103 may be fixedly connected with the reflector supporting assembly 1041 after alignment. In some embodiments, the receiving assembly 103 may include a receiving board (not shown) and a receiving board base 1031. The receiving board may be fixed by the receiving board base 1031. In some embodiments, the transceiver component 10 may further include a focusing assembly 106, the focusing assembly 106 may be place between the receiving assembly 103 and the reflector assembly 104. The reflected light signal may be directed to the receiving assembly after being converged by the focusing assembly 106. The focusing assembly 106 may include a focusing lens barrel 1061 and a focusing lens (not shown). The focusing lens may be placed in the focusing lens barrel 1061. One end (i.e., "the first end") of the focusing lens barrel 1061 may be aligned with a light exit port of the reflector assembly 104, and the other end (i.e., "the second end") of the focusing lens barrel 1061 may be aligned with a light input port of the receiving assembly 103. In some embodiments, the connection of the receiving assembly 103 and the focusing assembly 106, the connection of the reflector assembly 104 and the focusing assembly 106 may use one or more of a snap connection, a screw connection, a connection through pin(s), an adhesive connection, the like, or any combinations thereof. The receiving board of the receiving assembly 103 may be configured to obtain the reflected light signal. The receiving board may include a detector, such as an APD, an APD array, a MPPC, a SPAD, a PMT, a SIPM, or other detectors. The optical paths of the outgoing light signal and the reflected light signal as described above may be coaxial.

FIG. 7 is a lidar adjustment method according to some embodiments of the present disclosure. As shown in FIG. 7, the adjustment method may include the following steps:

S201, aligning a light exit port of the emitting assembly 101 with a first port of the beam splitting assembly 102, and fixing the emitting assembly 101 onto the base 100. The beam splitting assembly 102 and the base 100 may be an integrated structure or fixedly connected.

In some embodiments, in adjustment of the transceiver component 10, the beam splitting assembly 102 and the base 100 may form an integrated structure or be fixedly connected. The light exit port of the emitting assembly 101 may be aligned with the first port of the beam splitting assembly 102. The emitting assembly 101 may be accordingly fixed at the base 100. The connection therebetween may be a snap connection, a screw connection, a connection through pin(s), an adhesive connection, the like, or any combinations thereof. S201 may further include:

S2011, the beam splitting assembly 102 and the base 100 may be an integrated structure or fixedly connected. A fast-axis collimator lens may be fixed to the base 100 through a fast-axis collimator barrel 1051, and the fast-axis collimator lens may be disposed at the fast-axis collimator barrel 1051.

S2012, an emission board 1011 may be fixedly held by an emission board adjustment cover 1013 and an emission board adjustment base 1012. The emission board 1011 may be placed in an emission-board mounting position onto the base 100, and the position of the emitting assembly 101 may be adjusted so that the outgoing light signal emitted by the emitting assembly may be aligned with the first port of the beam splitting assembly 102 after passing through the fast-axis collimator lens.

S2013, a slow-axis collimator lens may be provided on an optical path between the emitting assembly 101 and the beam splitting assembly 102, and the slow-axis collimator lens may be mounted in the slow-axis collimator barrel 1052. At least one of the position of the slow-axis collimator lens and/or the position of the emission board 1011 may be adjusted so that the outgoing light signal emitted from the emitting assembly 101 may be aligned with the first port of the beam splitting assembly 102 after passing through the fast-axis collimator lens and the slow-axis collimator lens. In this case, the outgoing light signal may be a substantially parallel collimated light.

S2014, the emission board adjustment base 1012 and the slow-axis collimator barrel 1052 may be fixedly connected with the base to complete the installation of the emitting assembly 101 and the slow-axis collimator lens.

In some embodiments, the connection between the fast-axis collimator barrel 1051 and the base 100, the connection between the slow-axis collimator barrel 1052 and the base 100, and the connection between the emission board adjustment base 1012 and the base 100 may be snap connections, screw connections, connection through pin(s), adhesive connections, the like, or any combinations thereof.

S202, fixing the reflector supporting assembly 1041 of the reflector assembly 104 above the beam splitting assembly 102, and aligning a light input port of the reflector assembly 104 with the second port of the beam splitting assembly 102.

In some embodiments, after the emitting assembly 101, the beam splitting assembly 102, and the collimating assembly 105 are installed, the reflector supporting assembly 1041 of the reflector assembly 104 may be fixed above the beam splitter supporting assembly 1021 of the beam splitting assembly 102, and the light input port of the reflector assembly 104 may be aligned with the second port of the beam splitting assembly 102. The connection between the reflector supporting assembly 1041 and the beam splitter supporting assembly 1021 may a snap connection, a screw connection, a connection through pin(s), an adhesive connection, the like or any combinations thereof.

S203, aligning the light input port of the receiving assembly 103 with the light exit port of the reflector assembly 104, and fixing the receiving assembly 103 to the reflector assembly 104.

In some embodiments, after the reflector assembly 104 is installed, the light input port of the receiving assembly 103 may be aligned with the light exit port of the reflector assembly 104, and the receiving assembly 103 may be fixed to the reflector assembly 104. Step S203 may further include:

S2031, a focusing assembly 106 may be further provided on the optical path between the receiving assembly 103 and the reflector assembly 104. At least one focusing lens may be placed in a focusing lens barrel 1061.

S2032, one end of the focusing lens barrel may be aligned with the light exit port of the reflector assembly and be fixedly connected to the reflector supporting assembly; a light input port of the receiving assembly may be aligned with the other end of the focusing lens barrel, and the receiving board may be fixed to the receiving board base. The position of the receiving board base may be adjusted so that the receiving board may be approximately perpendicular to the optical axis of the focusing lens barrel.

S2033, the receiving board base 1031 and the focusing lens barrel 1061 may be fixedly connected, so as to finish the connection of the reflector assembly 104, the focusing assembly 106, and the receiving assembly 103.

In some embodiments, the connection between the reflector supporting assembly 1041 and the focusing lens barrel 1061, and the connection between the receiving board base 1031 and the focusing lens barrel 1061 may be snap connections, screw connections, connection through pin(s), adhesive connections, or any combinations thereof.

S204, receiving the reflected light signal emitted towards the receiving assembly 103.

In some embodiments, the outgoing light signal emitted by the emitting assembly 101 may enter the first port of the beam splitting assembly 102 and exit from a third port thereof and may be directed towards a detection region. At least part of the outgoing light signal may be reflected by a target object in the detection region and become a reflected light signal. The reflected light signal may enter the third port of the beam splitting assembly 102, deflected by the beam splitting assembly 102, and exit from the second port thereof. The reflected light signal may be reflected by the reflector assembly 104 and emitted towards the receiving assembly 103.

Before the adjustment, a known target object may be preset in a detection region, and a distance between the target object and the lidar may be known.

The reflected light signal may be obtained by a detector on a receiving board of the receiving assembly 103 and converted into an electrical signal output by the detector. In some embodiments, the receiving board may be at least one of APD and Silicon Photomultiplier (SIPM). The optical paths of the outgoing light signal and the reflected light signal between the beam splitting assembly 102 and the target object may be substantially coaxial.

S205, Comparing the reflected light signal with a preset light signal threshold.

The preset light signal threshold may be a preset voltage signal threshold or a preset current signal threshold.

In some embodiments, after obtaining the reflected light signal, the detector may convert the reflected light signal into a voltage signal and/or a current signal. The voltage signal may be compared with a preset voltage signal threshold, and/or the current signal may be compared with a preset current signal threshold.

S206. In response to the reflected light signal being lower than the preset light signal threshold, adjusting at least one of a position of the reflector or an angle of the reflector.

For example, the reflected light signal may be converted to a voltage signal by the detector of the receiving assembly 103. When the comparison result shows that the voltage signal is lower than the preset voltage signal threshold, the position and angle of the reflector in the reflector assembly may be adjusted to compensate for the errors accumulated in the previous steps. The angle, distance or the like of the reflector may be adjusted to make the voltage signal output by the receiving assembly meet the requirements. According to an embodiment, the reflector may be fixed onto a reflector cover, so the reflector may be adjusted by means of adjusting the reflector cover.

S207, in response to the reflected light signal being greater than or equal to the preset light signal threshold, determining that the current position of the reflector to be the desired position of the reflector and the current angle of the reflector to be the desired angle of the reflector.

In some embodiments, the desired position may indicate the position on which the reflector may be fixed, the reflector may have a good receiving performance at the desired position.

Accordingly, when the reflector 1043 is properly positioned as described above, the receiving assembly 103 may have a good receiving performance.

In the foregoing example where the reflected light signal is converted to a voltage signal, when the comparison result is that the voltage signal is greater than or equal to the preset voltage signal threshold, the current position of the reflector may be marked as a desired position of the reflector.

S208, according to the desired position of the reflector, fixedly mounting the reflector on the reflector supporting assembly corresponding to the desired position.

In some embodiments, the reflector may be fixed onto the mirror cover, the mirror cover may be fixed on the reflector supporting assembly 1041 based on the desired position of the reflector. In some embodiments, the mirror cover may be connected with the reflector supporting assembly 1041 via adhesive. The reflector after adjustment may be fixed based on the desired position of the reflector.

In the embodiments of the present disclosure, the transceiver component may further include the reflector assembly 104. The reflected light signal may be emitted towards the reflector assembly 104 after passing through the beam splitting assembly 102. The reflected light signal may be emitted towards the receiving assembly 103 after being reflected by the reflector assembly 104. In some embodiments of the present disclosure, the reflector assembly 104 may be used to reflect the reflected light signal. In some embodiments, the receiving optical path may be folded and shortened, so the volume of the transceiver component may be reduced, further reducing the volume of the lidar.

In installation and adjustment of the lidar, the beam splitting assembly and the base may be an integrated structure or fixedly connected. The light exit port of the emitting assembly may be aligned with the first port of the beam splitting assembly, and the emitting assembly may be fixed on the base based on the position of the beam splitting assembly. The reflector supporting assembly of the reflector assembly may be fixedly connected with the beam splitter supporting assembly of the beam splitting assembly. The light input port of the reflector assembly may be aligned with the second port of the beam splitting assembly. The light input port of the receiving assembly may be aligned with the light exit port of the reflector assembly and the receiving assembly may be fixedly connected with the reflector assembly. The receiving assembly may receive the reflected light signal and compare the reflected light signal with the preset light signal threshold. In response to the reflected light signal being lower than the preset light signal threshold, the position and the angle of the reflector assembly may be adjusted. In response to the reflected light signal being greater than or equal to the preset light signal threshold, the current position of the reflector assembly may be determined to be the desired position of the reflector assembly. In some embodiments, the lidar may include at least one transceiver component, and the emitting assembly, beam splitting assembly, reflector assembly, receiving assembly of each transceiver component may be pre-tuned before assembly, constituting a tuned transceiver component. During the assembly of lidar, a plurality of transceiver components may be spliced and the required field of view angle of the lidar may be met. The assembly process is simple and fast. When replacing a damaged emitting assembly or receiving assembly during maintenance, only the damaged part needs to be replaced and the corresponding transceiver module needs to be adjusted, so it is easy to maintain the product and reduce maintenance cost. At the same time, each transceiver component can be installed and adjusted separately to ensure that each transceiver component can emit and receive well, and thus the detection effect of lidar can be reliably guaranteed. Further, the reflector assembly may fold the receiving optical path of the transceiver component, thus the hardware used by this method may further reduce the volume of the lidar.

Figure 8:
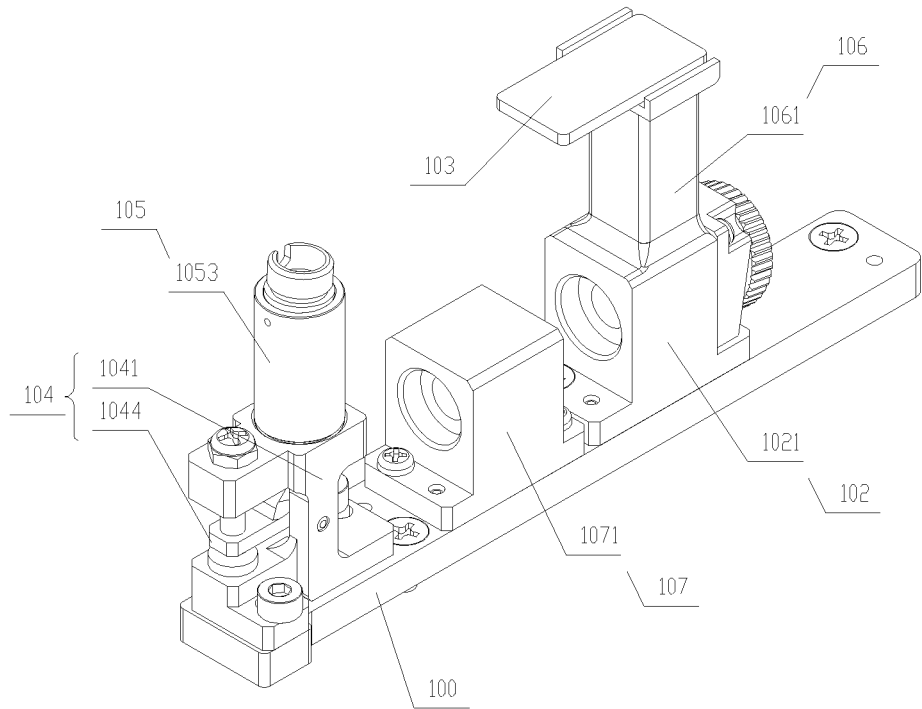
FIG. 8 is a schematic diagram of a structure of a transceiver component according to some embodiments of the present disclosure.

FIG. 8 is a schematic diagram of a lidar according to other embodiments of the present disclosure. Based on the embodiments, the transceiver component 10 may further include a reflector assembly 104 placed between the emitting assembly 101 and the beam splitting assembly 102. The outgoing light signal emitted by the emitting assembly 101 may be directed to the beam splitting assembly 102 after being reflected by the reflector assembly.

In some embodiments, the outgoing light signal passing through the reflector assembly 104 may enter the beam splitting assembly 102, thereby folding and compression of the receiving optical path to reduce the occupied space length and the occupied volume. In some embodiments, the outgoing light signal emitted by the emitting assembly may be emitted towards the beam splitting assembly 102 after passing through the reflector assembly and emitted to a detection region after passing through the beam splitting assembly. At least a part of the outgoing light signal may be reflected by a target object in the detection region. The reflected light signal may enter the beam splitting assembly and emits towards the receiving assembly 103 and may be received by the receiving assembly 103.

The transceiver component 10 may further include a base 100. At least one transceiver component 10 may be fixed on the base 100 based on an installation angle. When installed, each of the at least one transceiver component 10 may correspond to an installation angle. In addition, the material and shape of the base 100 may be determined according to actual use, which is not limited in this disclosure.

The reflector assembly 104 and the beam splitting assembly 102 may be fixed on the base 100 after being aligned with each other. The emitting assembly 101 may be accordingly fixedly connected with the reflector assembly 104 after being aligned with the reflector assembly 104. The receiving assembly 103 may be fixedly connected with the beam splitting assembly 102 after being aligned with the beam splitting assembly 102. In setting up the reflector assembly 104 and the beam splitting assembly 102 on the base 100, the reflector assembly 104 may be aligned with the beam splitting assembly 102, so the outgoing light signal emitted by the emitting assembly 101 may be directed to the beam splitting assembly 102 after being reflected by the reflector assembly 104. Accordingly, the reflector assembly 104 and the beam splitting assembly may be fixed. The connection of reflector assembly 104 and the base 100, and the connection of beam splitting assembly 102 and the base 100 may use one or more of a snap connection, a screw connection, a connection through pin(s), an adhesive connection, the like, or any combinations thereof.

In some embodiments, the reflector assembly 104 may include a reflector 1043, a reflector supporting assembly 1041, and an adjusting member 1044. The reflector 1043 may be mounted on the reflector supporting assembly 1041. The adjusting member 1044 may be configured to adjust the position and angle of the reflector 1043. The reflector 1043 may be fixed on the base 100 through the reflector supporting assembly 1041. In addition, the connection between the reflector supporting assembly 1041 and the base 100 may be a snap connection, a screw connection, a connection through pin(s), an adhesive connection, the like, or any combinations thereof.

The emitting assembly 101 may include an optical fiber for introducing a laser beam.

The transceiver component 10 may further include a collimating assembly 105. The collimating assembly 105 may be placed between the emitting assembly 101 and the reflector assembly 104. The outgoing light signal emitted by the optical fiber can be collimated through the collimating assembly 105 and emitted to the reflector assembly 104. In some embodiments, the collimating assembly 105 may include a collimating lens barrel 1053 and at least one collimating lens (not shown) in the collimating lens barrel 1053. The optical fiber may be aligned with the light input port of the collimator lens barrel 1053. The light exit port of the collimating lens barrel 1053 may be aligned with the light input port of the reflector assembly 104. The collimating lens barrel 1053 may be fixed on the reflector supporting component 1041, and the outgoing light signal may be directed to the reflector assembly 104 after passing through the collimating assembly 105.

The beam splitting assembly 102 may include a beam splitter supporting assembly 1021 and beam splitter 1022. The beam splitter supporting assembly 1021 may be formed as part of the base 100 or may be fixedly connected to the base 100. The beam splitter 1022 may be mounted and fixed in the beam splitter supporting assembly 1021. The beam splitter supporting assembly 1021 may form a cubic structure (e.g., a cubic housing). The beam splitter supporting assembly 1021 may include a mounting position inside the housing, so that the beam splitter 1022 may be mounted on and fixed to the mounting position at a preset tilt angle and position. For example, the mounting position of the beam splitter supporting assembly 1021 may include a mounting surface being pre-built with the preset tilt angle, so that when installed, the beam splitter 1022 may be placed and fixed to the mounting surface. The beam splitter supporting assembly 1021 and the base 100 may be formed as an integrated structure or fixedly connected with each other to ensure accuracy of the positioning. The connection between the beam splitter 1022 and the beam splitter support assembly 1021 may be a snap connection, a screw connection, an adhesive connection, the like, or any combinations thereof. Additionally, the material of the beam splitter supporting assembly 1021 may be the same as or different from the material of the base 100. The beam splitter can be a polarizing beam splitter, a reflector with a central opening, a semi-transmissive and semi-reflective mirror, the like, or any combinations thereof.

As shown in FIG. 8, the transceiver component may further include a secondary beam splitting assembly 107.

The second beam splitting assembly 107 may be placed between the reflector assembly 104 and the beam splitting assembly 102. The secondary beam splitting assembly 107 may include a secondary beam splitter supporting assembly 1071 and a secondary beam splitter (not shown). The secondary beam splitter supporting assembly 1071 may include a cubic structure (e.g., a cubic housing). The secondary beam splitter supporting assembly 1071 may include a secondary beam splitter mounting position to fix the secondary beam splitter at a preset tilt angle and position. Accordingly, when installed, the secondary beam splitter may be placed and mounted to the correspondingly secondary beam splitter supporting assembly 1071. The secondary beam splitter supporting assembly 1071 may be fixedly connected to the base 100. In some embodiments, the features and functions of the secondary beam splitting assembly 107 may be otherwise similar to those of secondary beam splitter 1023. Adding the secondary beam splitting assembly 107 between the beam splitting assembly 102 and the reflector assembly 104 can reduce the intensity of the outgoing signal light passing through to the beam splitter 1022, thereby reducing local heating. Since the secondary beam splitting assembly 107 filters out the S polarized light, the S-polarized light may be directed away from the receiving assembly 103, and undesired effects caused by the S-polarized light to the receiving assembly 103 are minimized. Certainly, one of ordinary skill in the art would understand that without the secondary beam splitting assembly 107, the transceiver component 10 may still emit and receive the laser beam and reach its design requirements of signal detection. However, having the secondary beam splitting assembly 107 may eliminate the effects of the S-polarized light signal to the receiving assembly 103 and improve the detection performance and detection accuracy of the transceiver component 10.

As shown in FIG. 8, the receiving assembly 103 may be fixedly connected with the beam splitting assembly 102 after being aligned with the beam splitting assembly 102. In some embodiments, the transceiver component 10 may further include a focusing assembly 106, the focusing assembly 106 may be placed between the receiving assembly 103 and the beam splitting assembly 102. The reflected light signal may be directed to the receiving assembly 103 after being converged by the focusing assembly 106. The focusing assembly 106 may include a focusing lens barrel 1061 and a focusing lens (not shown). The focusing lens may be placed in the focusing lens barrel 1061. One end (i.e., "the first end") of the focusing lens barrel 1061 may be aligned with a light exit port of the beam splitting assembly 102, and the other end (i.e., "the second end") of the focusing lens barrel 1061 may be aligned with a light input port of the receiving assembly 103.

Figure 9:
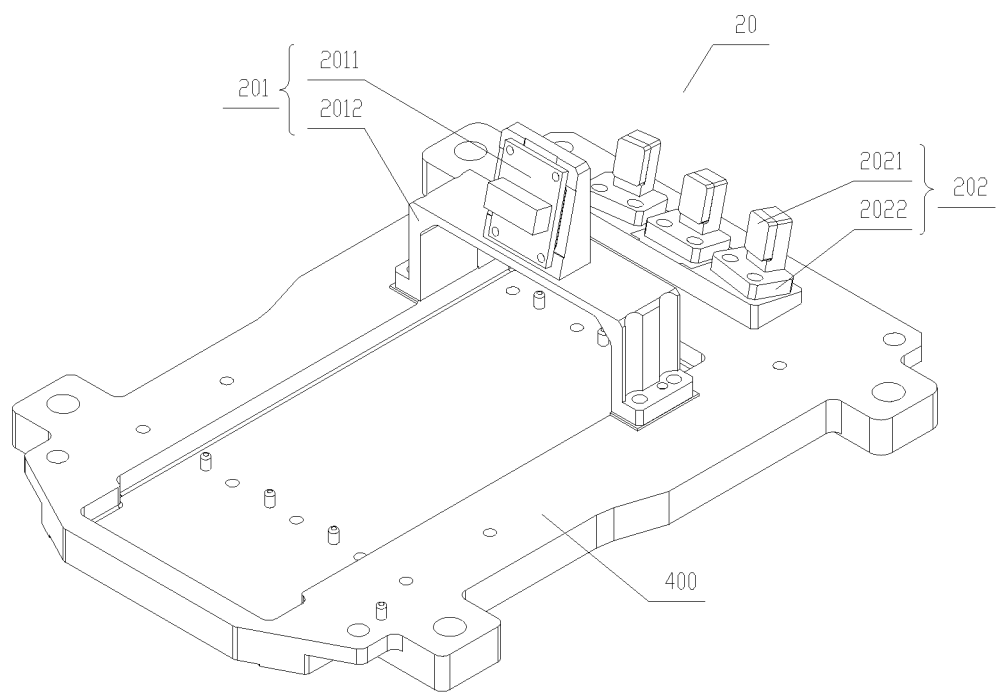
FIG. 9 is a schematic diagram of a base plate and a scanning component of a lidar according to some embodiments of the present disclosure.
Figure 10:
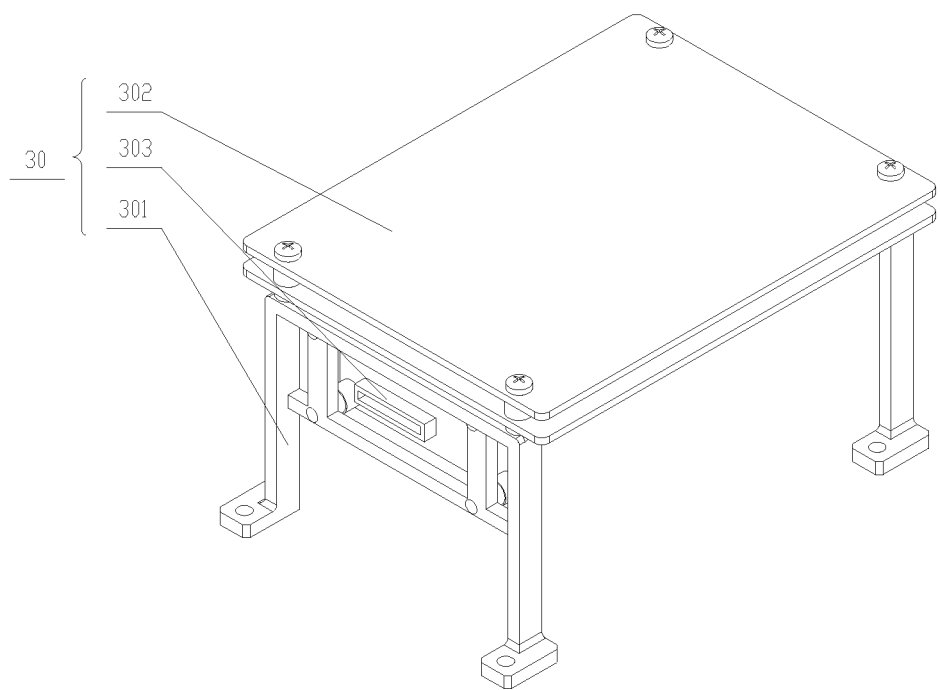
FIG. 10 is a schematic diagram of a hardware component of a lidar according to some embodiments of the present disclosure.

As shown in FIG. 9 and FIG. 10, in some embodiments, the lidar may include a plurality of transceiver components 10. The lidar may also include a housing component, a hardware component 30 and a scanning component 20.

The housing component may include a cover (not shown) and a bottom plate 400. The plurality of transceiver components 10, the hardware component 30, and the scanning component 20 may be all disposed in a cavity enclosed by the cover and the bottom plate 400.

The hardware component 30 may include a base board 302, a control board 303, and a bracket 301. The bracket 301 may include a platform and a plurality of legs. The plurality of legs may be evenly disposed below the platform to support the entire platform. The lower ends of the legs may be fixedly connected to the bottom plate 400. Both the base board 302 and the control board 303 may be fixed on the bracket 301.

The scanning component 20 includes a galvanometer assembly 201 and a reflector assembly 202. The galvanometer assembly 201 may include a galvanometer 2011 and a galvanometer support component 2012. The galvanometer 2011 may be fixed on the bottom plate 400 through the galvanometer support component 2012. The reflector assembly 202 may include a plurality of reflectors 2021. The reflectors 2021 and the transceiver components 10 may be disposed in a one-to-one correspondence. Each of the reflectors 2021 may be fixedly connected with the bottom plate 400 through a reflector support component 2022.

An outgoing light signal of the transceiver component 10 may be directed towards a corresponding reflector 2021. The outgoing light signal may be reflected by reflector 2021 and directed towards the galvanometer 2011. The galvanometer 2011 may direct the outgoing light signal to travel outwards for scanning. A reflected light signal from a target object may be received by the galvanometer 2011 and directed towards the reflector 2021. The reflector 2021 may reflect the reflected light signal towards a corresponding transceiver component 10 for the transceiver component 10 to receive the reflected light signal.

FIG. 11 is a lidar adjustment method according to some embodiments of the present disclosure. The method may include the following steps:

S301, the beam splitting assembly 102 and the base 100 may be an integrated structure or fixedly connected.

The beam splitting assembly 102 and the base 100 may form an integrated structure or be fixedly connected. In some embodiments, if a secondary beam splitting assembly is further included, the secondary beam splitting assembly may be aligned with the beam splitting assembly, and integrated or fixedly connected with the base.

S302, aligning the light exit port of the emitting assembly 101 with the light input port of the reflector assembly 104; aligning the light exit port of the reflector assembly 104 with the first port of the beam splitting assembly 102; adjusting at least one of the position of the emitting assembly 101, the position of the reflector assembly 104, and the angle of the reflector assembly 104, so that the outgoing light signal from the emitting assembly 101 may be reflected by the reflector assembly 104 towards the first port of the beam splitting assembly 102. The reflector assembly 104 may be accordingly fixed to the base 100, and the emitting assembly 101 be fixed to the reflector assembly 104.

In some embodiments, step S302 may further includes:

S3021, fixing a reflector 1043 on an adjusting member 1044. The adjusting member 1044 may be assembled with the reflector supporting assembly 1041.

S3022, a light exit of a collimator barrel of the collimating assembly 105 may be aligned with the reflector 1043 and fixed to the reflector supporting assembly 1041. The optical fiber of the emitting assembly 101 may be aligned with the light input port of the collimator barrel.

S3023, the light exit port of the reflector assembly 104 may be aligned with the first port of the beam splitting assembly 102 or the secondary beam splitting assembly 107, and the reflector supporting assembly 1041 may be fixed to the base 100.

S3024, the angle and the position of the reflector 1043 may be adjusted through the adjusting member 1044, so that the outgoing light signal emitted by the emitting assembly 101 may pass through the collimating assembly 105 towards the reflector 1043. The outgoing light may be reflected by the reflector 1043 towards the first port of the beam splitting assembly 102 or the secondary beam splitting assembly 107.

In some embodiments, the connection between the reflector supporting assembly 1041 and the base 100, and the connection between the collimator barrel and the reflector supporting assembly 1041 may be snap connections, screw connections, connection through pin(s), adhesive connections, the like, or any combinations thereof.

S303, aligning the light input port of the receiving assembly 103 with the second port of the beam splitting assembly 102 to receive the reflected light signal directed to the receiving assembly 103. In some embodiments, the outgoing light signal emitted by the emitting assembly 101 may enter the first port of the beam splitting assembly 102 and exit from the third port thereof towards a detection region. At least a part of the outgoing light signal may be reflected by a target object in the detection region; the reflected light signal may enter the third port of the beam splitting module 102, deflected by the beam splitting assembly 102, and exit from the second port thereof towards the receiving assembly 103.

In some embodiments, step S303 may further includes:

S3031, a focusing assembly 106 may be provided on the optical path between the beam splitting assembly 102 and the receiving assembly 103. At least one focusing lens may be provided in the focusing lens barrel 1061.

S3032, one end of the focusing lens barrel 1061 may be aligned with the second port of the beam splitting assembly 102, and the focusing lens barrel 1061 may be fixedly connected to the beam splitter supporting assembly 1021.

S3033, a light input port of the receiving assembly 103 may be aligned with the other end of the focusing lens barrel to obtain the reflected light signal directed towards the receiving assembly 103 by the focusing assembly 106.

Before adjustment, a known target object may be preset in the detection region, and a distance between the target object and the lidar may be known.

In some embodiments, an outgoing light signal emitted by the emitting assembly may enter the first port of the beam splitting assembly and exit from a third port thereof and may be directed towards the detection region. The outgoing light signal may be reflected by the target object in the detection region. The reflected light signal may enter the third port of the beam splitting module, deflected by the beam splitting assembly, and exit from the second port thereof towards the receiving assembly. The reflected light signal may be received by a detector on a receiving board of the receiving assembly and converted into an electrical signal output by the detector. In some embodiments, the receiving board may include at least one of APD and SIPM.

In some embodiments, the connection between the focusing lens barrel and the beam splitter supporting assembly may be a snap connection, a screw connection, a connection through pin(s), an adhesive connection, the like, or any combinations thereof.

S304, comparing the reflected light signal with a preset light signal threshold.

The preset light signal threshold may be a preset voltage signal threshold or a preset current signal threshold.

In some embodiments, after obtaining the reflected light signal, the detector may convert the reflected light signal into a voltage signal or a current signal; and the voltage signal may be compared with a preset voltage signal threshold, or the current signal may be compared with a preset current signal threshold.

S305. In response to the reflected light signal being lower than the preset light signal threshold, adjusting the position of the receiving assembly 103.

For example, when the reflected light signal is converted to a voltage signal by the receiving assembly, if the voltage signal is lower than the preset voltage signal threshold, the position of the receiving assembly 103 may be adjusted, until the voltage signal output by the receiving assembly 103 meets the requirements.

S306, in response to the reflected light signal being greater than or equal to the preset light signal threshold, determining that the current position of the receiving assembly is a desire position of the receiving assembly.

In the desired position, the receiving assembly may have a good receiving performance. That is, the optical axis of the receiving assembly may be substantially aligned with the optical axis of the focusing assembly.

In the foregoing example where the reflected light signal is converted to a voltage signal at the receiving assembly, when the comparison result obtained by the detector is that the voltage signal is greater than or equal to the preset voltage signal threshold, the current position of the receiving assembly may be determined to be the desired position of the receiving assembly.

S307, fixing the receiving assembly 103 according to the desired position, such that the installation and adjustment of the entire transceiver component is completed.

When the field of view angle of a single transceiver component cannot meet the requirement, the lidar may be provided with a plurality of the transceiver components. The lidar may further include a bottom plate, a hardware component, a galvanometer assembly, and a reflector assembly, as shown in FIGS. 9 and 10. The adjustment method shown in FIG. 11 may further include the following steps (not shown in FIG. 14):

S308, a plurality of transceiver components after installation and adjustment may be placed on the installation positions of the bottom plate. A scanning component may be fixed on the bottom plate. A galvanometer may be fixed on the bottom plate by a galvanometer support component. A reflector may be fixed on the bottom by a reflector support component. Each reflector may correspond to a transceiver component, the transceiver component may be adjusted so the outgoing light signal emitted by the transceiver component may be aligned with the corresponding reflector. the transceiver component may be fixedly connected with the bottom plate via the base.

S309, the base board and the control board of the hardware component may be fixed on the bracket. The bracket may be fixedly connected with the bottom plate.

S310, after the internal installation and adjustment are completed, the cover and the bottom place may be closed after assembly.

According to a further embodiment, the transceiver component may further include a reflector assembly. The reflector assembly may be configured to reflect the outgoing light signal, and the outgoing light path may thus be folded to become shorter. In this way, the volume taken the transceiver component may be reduced, and accordingly, the volume of the lidar is reduced as well.

In some embodiments, the beam splitting assembly and the base may form an integrated structure or fixedly connected with each other. The light exit port of the emitting assembly may be aligned with the light input port of the reflector assembly. The emitting assembly and the reflector assembly may be fixed. The light exit port of the reflector assembly may be aligned with the first port of the beam splitting assembly. The reflector assembly may be fixed on the base. The light input port of the receiving assembly may be aligned with the second port of the beam splitting assembly, and the receiving assembly receives the reflected light signal. Next, the reflected light signal may be compared with the preset light signal threshold. In response to the reflected light signal being lower than the preset light signal threshold, the position and the angle of the receiving assembly may be adjusted. In response to the reflected light signal being greater than or equal to the preset light signal threshold, it may be determined that the current position of the receiving assembly is the desired position of the receiving assembly. The receiving assembly may be accordingly fixedly installed according to the desired position of the receiving assembly.

In some embodiments, the lidar may include at least one transceiver component. The emitting assembly, the beam splitting assembly, and the receiving assembly of each transceiver component may be adjusted before assembling lidar. After the transceiver component is adjusted, it may be mounted on the bottom plate as a whole. In some embodiments, the lidar may include a scanning component on the bottom plate. After being adjusted, both the transceiver component and the scanning component may be fixed to the bottom plate. Next, the hardware component may be fixed to the bottom plate for internal adjustment. Finally, the cover and the bottom plate may be assembled and packaged to complete the entire installation and adjustment of the lidar.

When the lidar is assembled, the plurality of transceiver components 10 are combined to provide the field of view angle required by the lidar. The installation and adjustment process become simple and fast. When the emitting assembly or the receiving assembly needs to be replaced for maintenance, only the damaged part thereof needs to be replaced and a corresponding transceiver component is readjusted. Accordingly, the emitting assemblies and the receiving assembly of other transceiver components do not need to be readjusted. In this way, the product maintenance becomes easier and has a lower cost. In addition, each transceiver component is individually adjusted, which ensures that the transmission and reception of each transceiver component is good, and thus the detection effect of the lidar can be reliably guaranteed.

The technical features of the embodiments described above may be combined in many different ways. In order to make the description concise, not every possible combination of the technical features in the above embodiments has been described herein. However, as long as there is no contradiction in the combination of these technical features, such a combination should be considered as within the scope disclosed in this specification. It should be noted that "in an embodiment," "for example," "another example," and the like in the present disclosure are intended to illustrate the present disclosure instead of limiting the present disclosure.

The aforementioned embodiments are merely a few embodiments of the present disclosure. Their descriptions are specific and detailed but should not be understood as the limitations on the scope of the present disclosure. It is appreciated by a person of ordinary skill in the art that many variations and improvements may be made without departing from the concept of the present disclosure, and these variations and improvements all fall within the scope of protection of the present disclosure. Therefore, the scope of protection of the present disclosure shall be defined by the appended claims.

What is claimed is:

1. A lidar, comprising at least one transceiver component, a bottom plate, a galvanometer assembly, and a hardware component,
   wherein the at least one transceiver component includes an emitting assembly, a beam splitting assembly, and a receiving assembly;
   wherein the emitting assembly is configured to emit an outgoing light signal, the outgoing light signal being emitted, through the beam splitting assembly, towards a detection region and reflected by a target object to form a reflected light signal;
   wherein the receiving assembly is configured to receive the reflected light signal after being deflected by the beam splitting assembly;
   wherein the at least one transceiver component is arranged on the bottom plate according to an installation angle;
   wherein the galvanometer assembly is arranged on the bottom plate; and
   wherein the hardware component comprises a PCB board, a control board, and a bracket, the bracket being arranged on the bottom plate, and the PCB board and the control board being connected with the bracket, respectively.

2. The lidar of claim 1, the at least one transceiver component further comprising a reflector assembly,
   wherein the reflector assembly is disposed between the beam splitting assembly and the receiving assembly, the reflected light signal being directed to the receiving assembly after passing through the beam splitting assembly and being reflected by the reflector assembly.

3. The lidar of claim 2, the at least one transceiver component further comprising a base;
   wherein the beam splitting assembly includes a beam splitter supporting assembly and a beam splitter, the beam splitter supporting assembly and the base forming an integrated structure or being fixedly connected; and
   wherein the beam splitter is fixed by the beam splitter supporting assembly.

4. The lidar of claim 2, wherein the reflector assembly comprises a reflector supporting assembly and a reflector, the reflector being fixed by the reflector supporting assembly.

5. The lidar of claim 4, wherein the reflector supporting assembly is aligned with the beam splitter supporting assembly to connect the reflector supporting assembly with the beam splitter supporting assembly.

6. The lidar of claim 4, wherein the receiving assembly is aligned with the reflector supporting assembly to connect the receiving assembly with the reflector supporting assembly.

7. The lidar of claim 3, wherein the emitting assembly is aligned with the beam splitting assembly to connect the emitting assembly with the base.

8. The lidar of claim 7, wherein the emitting assembly comprises an emission board supporting assembly and an emission board, the emission board being fixed by the emission board supporting assembly.

9. The lidar of claim 8,
   wherein the emission board supporting assembly comprises an emission board adjustment cover and an emission board adjustment base, the emission board being positioned by the emission board adjustment cover and the emission board adjustment base; and
   wherein the emission board is aligned with the beam splitting assembly to position the emission board adjustment base at the base.

10. The lidar of claim 1,
wherein the at least one transceiver component further comprises a collimating assembly disposed between the emitting assembly and the beam splitting assembly; and
wherein the outgoing light signal emitted by the emitting assembly is directed to the beam splitting assembly after being collimated by the collimating assembly.

11. The lidar of claim 10,
wherein the at least one transceiver component further comprises a base;
wherein the collimating assembly includes a fast-axis collimating lens and a slow-axis collimating lens, the fast-axis collimating lens and the base forming an integrated structure or being fixedly connected; and
wherein the slow-axis collimating lens and the emitting assembly are aligned with the fast-axis collimating lens to connect the slow-axis collimating lens and the emitting assembly at the base.

12. The lidar of claim 1, the at least one transceiver component further comprising a reflector assembly,
wherein the reflector assembly is disposed between the emitting assembly and the beam splitting assembly, the outgoing light signal, emitted by the emitting assembly, being directed to the beam splitting assembly after being reflected by the reflector assembly.

13. The lidar of claim 12, the at least one transceiver component further comprising a base,
wherein the beam splitting assembly comprises a beam splitter supporting assembly and a beam splitter, the beam splitter supporting assembly and the base forming an integrated structure or being fixedly connected; and
wherein the beam splitter is fixed by the beam splitter supporting assembly.

14. The lidar of claim 13,
wherein the reflector assembly is aligned with the beam splitting assembly to connect the reflector assembly with the base;
wherein the emitting assembly is aligned with the reflector assembly to position the emitting assembly; and
wherein the receiving assembly is aligned with the beam splitting assembly to position the receiving assembly.

15. The lidar of claim 12,
wherein the emitting assembly further comprises an optical fiber configured to direct laser;
wherein the at least one transceiver component further comprises a collimating assembly disposed between the emitting assembly and the reflector assembly; and
wherein a light signal emitted by the optical fiber is directed to the reflector assembly after being collimated by the collimating assembly.

16. The lidar of claim 1, wherein the receiving assembly comprises at least one of an Avalanche Photo Diode (APD), an APD array, a Multi-Pixel Photon Counter (MPPC), a Single-photon Avalanche Diode (SPAD), a Photomultiplier Tube (PMT), or a Silicon Photomultiplier (SIPM).

17. A lidar adjustment method, comprising:
aligning a light exit port of an emitting assembly with a first port of a beam splitting assembly, the emitting assembly being fixed on a base, and the beam splitting assembly and the base forming an integrated structure or being fixedly connected;
aligning a light input port of a reflector assembly with a second port of the beam splitting assembly, a reflector supporting assembly of the reflector assembly being fixed on top of the beam splitting assembly;
aligning a light input port of a receiving assembly with a light exit port of the reflector assembly;
receiving, through the receiving assembly, a reflected light signal, wherein an outgoing light signal from the emitting assembly enters the first port of the beam splitting assembly, exits from a third port of the beam splitting assembly and emits to a detection region where it is reflected by a target object to form a reflected light signal; wherein the reflected light signal enters the third port of the beam splitting assembly and exits from the second port of the beam splitting assembly after being deflected by the beam splitting assembly; and wherein the reflected light signal is emitted towards the receiving assembly after being reflected by a reflector of the reflector assembly;
comparing the reflected light signal with a preset light signal threshold;
in response to the reflected light signal being lower than the preset light signal threshold, adjusting at least one of a position of the reflector, an angle of the reflector, or a position of the receiving assembly;
in response to the reflected light signal being greater than or equal to the preset light signal threshold, determining a current position of the reflector to be a desired position of the reflector, a current angle of the reflector to be a desired position of the reflector, and a current position of the receiving assembly to be a desired position of the receiving assembly;
mounting the reflector on the reflector supporting assembly based on the desired position and the desired angle of the reflector; and
connecting the receiving assembly with the reflector assembly based on the desired position of the receiving assembly.

18. The lidar adjustment method of claim 17, further comprising;
fixing a fast-axis collimating lens on the base, and adjusting a position of the emitting assembly so that a first light spot of the outgoing light signal is compressed to a first preset state along a fast-axis after the outgoing light signal, emitted by the emitting assembly, passes the fast-axis collimating lens;
placing a slow-axis collimating lens between the emitting assembly and the beam splitting assembly; adjusting at least one of the slow-axis collimating lens or a position of an emission board so that a second light spot of the outgoing light signal is compressed to a second preset state along a slow-axis after the outgoing light signal, emitted by the emitting assembly, passing the slow-axis collimating lens; and
fixing the emitting assembly and the slow-axis collimating lens on the base.

19. A lidar adjustment method, comprising:
aligning a light exit port of an emitting assembly with a first port of a beam splitting assembly, the emitting assembly being fixed on a base, the beam splitting assembly and the base forming an integrated structure or being fixedly connected;
aligning a light input port of a receiving assembly with a second port of the beam splitting assembly to receive a reflected light signal that emits towards the receiving assembly, wherein an outgoing light signal from the emitting assembly enters the first port of the beam splitting assembly, exits from a third port of the beam splitting assembly, and emits to a detection region where it is reflected by a target object to form the reflected light signal; wherein the reflected light signal enters the third port of the beam splitting assembly, exits from the second port of the beam splitting assembly after being deflected by the beam splitting assembly, and is emitted towards the receiving assembly;

comparing the reflected light signal with a preset light signal threshold;

in response to the reflected light signal being lower than the preset light signal threshold, adjusting a position of the receiving assembly;

in response to the reflected light signal being greater than or equal to the preset light signal threshold, determining a current position of the receiving assembly to be a desired position of the receiving assembly; and mounting the receiving assembly based on the desired position of the receiving assembly.

* * * * *